United States Patent [19]
Munter et al.

[11] Patent Number: 5,447,747
[45] Date of Patent: Sep. 5, 1995

[54] METHOD AND APPARATUS FOR SMOOTHING GRAVURE COATINGS IN THE MANUFACTURE OF MAGNETIC RECORDING TAPE

[75] Inventors: John D. Munter, Oakdale, Minn.; Donald M. Lewis; Scott D. Stenstrom, both of Hudson, Wis.

[73] Assignee: Minnesota Mining and Manufacturing Company, St. Paul, Minn.

[21] Appl. No.: 293,481

[22] Filed: Aug. 22, 1994

[51] Int. Cl.⁶ .................................. H01F 10/02
[52] U.S. Cl. ..................... 427/130; 118/123; 427/128; 427/358; 427/444
[58] Field of Search ............... 427/128, 130, 358, 444; 118/123

[56] References Cited

U.S. PATENT DOCUMENTS

| | | |
|---|---|---|
| 3,761,311 | 9/1973 | Perrington et al. .................... 117/239 |
| 4,254,585 | 3/1981 | Schoettle et al. ...................... 51/5 A |
| 4,298,631 | 11/1981 | Mikura et al. ......................... 427/130 |
| 4,361,627 | 11/1982 | Ohata ................................ 428/425.9 |
| 4,391,851 | 7/1983 | Yamada et al. ....................... 427/130 |
| 4,499,121 | 2/1985 | Yamaguchi et al. .................. 427/130 |
| 4,499,122 | 2/1985 | Economy et al. ..................... 427/130 |
| 4,519,757 | 5/1985 | Wittkopf et al. ...................... 425/143 |
| 4,547,393 | 10/1985 | Asai et al. ............................. 427/48 |
| 4,577,077 | 3/1986 | Kawamata .......................... 219/10.43 |
| 4,870,920 | 10/1989 | Kageyama et al. ................... 118/103 |
| 4,911,951 | 3/1990 | Ogawa et al. ........................ 427/130 |
| 4,962,578 | 10/1990 | Saito et al. ............................. 29/132 |

FOREIGN PATENT DOCUMENTS

| | | |
|---|---|---|
| 50-22835 | 3/1975 | Japan . |
| 60-34828 | 2/1985 | Japan . |
| 60-57387 | 12/1985 | Japan . |
| 5-128510 | 5/1993 | Japan . |

OTHER PUBLICATIONS

Benkreira et al.: "Direct Gravure Roll Coating", Chemical Engineering Science, vol. 48, No. 12, 1993, pp. 2329-2335 (no month available).
Benkreira et al.: "Gravure Roll Coating of Low Viscosity Liquids", Surface Coating International JOCCA, vol. 75, No. 7, Jul. 1992, pp. 261-268.
Patel et al.: "Gravure Roll Coating of Newtonian Liquids", Chemical Engineering Science, vol. 46, No. 3, 1991, pp. 751-756 (no month available).
Pulkrabek et al.: "Knurl Roll Design for Stable Rotogravure Coating", Chemical Engineering Science, vol. 38, No. 8(1983), pp. 1309-1314 (no month available).
Witt: "Reverse Gravure . . . Part I", Paper, Film & Foil Converter, vol. 51, Sep. 1977, pp. 51-53.

*Primary Examiner*—Bernard Pianalto
*Attorney, Agent, or Firm*—Gary L. Griswold; Walter N. Kirn; Charles D. Levine

[57] ABSTRACT

A wet gravure coating of fine magnetizable particles can be smoothed by a rectangular piece of flexible film that is secured at one end in flat jaws of a clamp to leave its opposite end free to drag against the coating, thus causing the flexible film to form an arc between its secured end and the convergence of the flexible film with the wet coating. The jaws also secure a flat plate which has a straight edge that deflects the arcuate portion of the flexible film toward the coating along a line extending transversely across the full width of the flexible film. The plate can be repositioned during the smoothing to adjust the radius of curvature of the arc in order to correct any defects that may appear in the smoothed coating. When the backing web is wide and is advanced at economically high speeds, the free end of the flexible film can be tensioned so that its trailing edge becomes bowed and in contact with the coating over its full width.

15 Claims, 3 Drawing Sheets

METHOD AND APPARATUS FOR SMOOTHING GRAVURE COATINGS IN THE MANUFACTURE OF MAGNETIC RECORDING TAPE

BACKGROUND OF THE INVENTION

1. Field of the Invention

The invention is primarily concerned with method and apparatus for making magnetic recording media using gravure coating to apply magnetizable layers. The invention is specifically concerned with method and apparatus for smoothing gravure and other patterned coatings.

2. Description of the Related Art

The magnetizable layers of most magnetic recording media consist of coatings of fine magnetizable particles in organic binder. The magnetizable particles typically have a maximum dimension of less than 1 μm. A magnetizable coating should be of uniform thickness, typically less than 1.0 mil (25 μm), and should be free from defects such as pinholes, streaks, and particle agglomerates. The coatings can be applied by a direct gravure coater as illustrated in U.S. Pat. No. 3,761,311 (Perrington et al.), FIG. 1 of which shows "a tank 10 which is continuously supplied with a dispersion 11 of magnetizable particles and binder. This is picked up in the fine grooves of a gravure roll 12 which is scraped by a doctor blade 13 so that substantially the only material left is that contained in the grooves. The dispersion is pressed by a rubber roll 14 into contact with and transferred to an uncoated backing member 15 which is moving at the same speed and in the same direction as the gravure roll 12, as indicated by the arrow 16. Before significant evaporation of the volatile vehicle, the knurl pattern of the coating is smoothed out by a flexible blade 17. The coated backing member then passes between a pair of bar magnets 18 to physically align the magnetizable particles and on to a heated oven 19 to dry the coating" (col. 4, line 65 through col. 5, line 4).

The Perrington patent does not explain the smoothing operation of the flexible blade 17 or give any information as to its construction.

Japanese Pat. No. 50-22835, which issued Mar. 11, 1975 to Fuji Film Co., concerns the smoothing of wet coatings of magnetizable particles that have been applied by gravure coating. It reports testing of two types smoothing sheets of plastic film, the working or trailing edges of which are (1) curved or (2) straight except for diagonal corners. Both types afforded improved smoothing compared to a prior rectangular sheet. In the first of two experiments, the smoothing sheets were poly(ethyleneterephthalate) having a thickness of 10 μm, a width of 30 cm, and a length of 12 cm. In the second experiment, the smoothing sheets were triethlycellulose having a thickness of 20 μm, a width of 30 cm, and a length of 18 cm. The Japanese patent '835 also concludes that a thinner smoothing sheet is more effective than a thick film, because a thinner smoothing sheet makes better contact with the coated backing member.

U.S. Pat. No. 4,547,393 (Asai et al., assigned to Fuji Photo Film Co.) cites Japanese patent publications No. 96469/72 and 53631/74 for prior teachings of using a flexible sheet to smooth a coating of highly viscous solution. In the Asai patent, a flexible sheet smooths while the coating is subjected to a magnetic field. The Asai patent says: "The thickness of the flexible sheet is from about 4 microns to 120 microns. The material for the sheet includes a polyester film comprising polyethylene terephthalate; a cellulose derivative film comprising cellulose triacetate and cellulose diacetate; a polycarbonate film, a polyimide film; a polyolefin film comprising of polyethylene, polypropylene; a polyvinyl chloride film and a polyvinylidene chloride film" (col. 3, lines 45–52). In FIG. 1 of Asai, the flexible smoothing sheet 4 is mounted on a pedestal 5. "Longitudinal lines or streaks formed on sheet 4 can be prevented by moving the position of fixing pedestal 5" (col. 3, lines 15–17). In FIG. 2, the flexible smoothing sheet 11 is mounted on a roll 12. "The contact area of the sheet at the smoothening area can be adjusted by turning roll 12 in the direction of the arrow shown in FIG. 2. Longitudinal lines or streaks occurring on a sheet can be prevented by adjusting the contact area" (col. 3, lines 28–32).

U.S. Pat. No. 4,870,920 (Kageyama et al.) uses a rigid smoothing bar to smooth wet coatings of magnetizable particles and cites Japanese Patent O.P.I. Publication No. 8646/1979 for "using a bar shaped stiff member having a smooth surface called a smoothing bar or such a process using a deformable plate-shaped stiff member having a smooth surface called a smoothing blade" (col. 1, lines 33–38). It then cites Japanese Utility Model O.P.I. Publication No. 6008/1980 for "a process using a combination of the described flexible sheet and a bar" (col. 1, lines 38–41). In that combination, "a bar provided with a flexible sheet is reciprocated in the direction perpendicularly intersecting to the traveling direction of a support" (col. 1, lines 60–63). The smoothing bar of the Kageyama patent is formed with grooves 7 that move the coating laterally without needing to reciprocate the smoothing bar.

Japanese Pat. publication No. Shouwa 60[1985]-57387 assigned to Fuji Film K. K., uses a solid body smoother 3 (FIG. 1) to smooth wet coatings of magnetizable particles. The solid body smoother can be formed of stainless steel to have a shape such as those shown in FIGS. 2 and 3 of the '387 publication.

SUMMARY OF THE INVENTION

The present invention provides method and apparatus for smoothing a gravure or other patterned coating of a fluid dispersion of magnetizable particles and binder while the coating is being applied to a flexible backing web [such as a biaxially oriented poly(ethyleneterephthalate) film] in the manufacture of magnetic recording media. Such method and apparatus produce magnetizable coatings that have uniform thickness and are virtually free from imperfections such as pinholes and streaks. One reason for this is that the operator can easily adjust the novel apparatus during the smoothing to correct immediately any defect that may appear.

Briefly, the smoothing apparatus of the invention includes means for continuously smoothing a wet gravure coating of fine magnetizable particles on an elongated flexible backing web which is being advanced longitudinally under tension. The smoothing apparatus includes:

(a) mounting means, (b) a flexible film secured at one end to the mounting means, leaving its opposite end free to drag against the wet coating, thus causing the flexible film to form an arc between its secured end and the convergence of the flexible film with the coating, (c) means for deflecting the arcuate portion of the flexible film toward the coating along a line extending transversely across the full width of the flexible film, and (d) means (such as a flat metal plate) for moving the deflecting means to change the position of the transverse line to adjust the radius of curvature of the arc at the line.

Preferably, the novel smoothing apparatus also includes:

(e) means for holding the free end of the flexible film in contact with the wet coating across the full width of the coating.

Specific holding means (e), which help to keep the flexible backing web flat, are disclosed below in the discussion of the drawing. Such holding means are especially desirable under conditions tending to cause the backing web to buckle in the crosswise direction. Buckling is more likely to occur when the backing web is thin, e.g., less than 0.4 mils (10 μm) thick, or when tension on the backing web is high, or when the drag of the flexible film reduces to near zero the tension in the backing web upstream of the transverse line. Moreover, buckling is more likely to occur at the extraordinarily high tape speeds that may be necessary to minimize the cost of producing magnetic recording media.

While the wet coating is being smoothed by the dragging free end of the flexible film, the means for moving permit an experienced operator to make precise adjustments to prevent repetitions of defects that may appear in the smoothed coating.

The flexible film preferably is a biaxially oriented polymeric film. Its trailing edge preferably is straight, because a straight edge can be economically formed with precision to be free from burrs or other defects that otherwise would introduce imperfections into the coating. The trailing edge could have other shapes, but it would be more difficult to ensure against defects. When the flexible film has a straight trailing edge, the mounting means should keep the trailing edge extending substantially perpendicular to the longitudinal direction of the backing web.

A preferred flexible film is biaxially oriented poly(ethyleneterephthalate) film. Other useful flexible polymeric films include polycarbonate, polyimide, polyolefin, poly(vinyl chloride), and poly(vinylidene chloride) films. The flexible film should have a flexural modulus (ASTM Test Method D790) of from 50 to 1000 lb/in² (345 to 6900 MPa). Useful flexible polymeric films having flexural moduli within that range have thicknesses of from 1 to 10 mils (25 to 250 μm). The flexible film preferably is from 2 to 7 mils (50 to 175 μm) in thickness.

The mounting means of the novel apparatus preferably mounts two pieces of flexible film and includes means for smoothing the wet coating with either flexible film while the other flexible film is retracted. This allows a worn piece of flexible film to be replaced without interrupting the manufacturing process.

DETAILED DESCRIPTION

Figure 1:
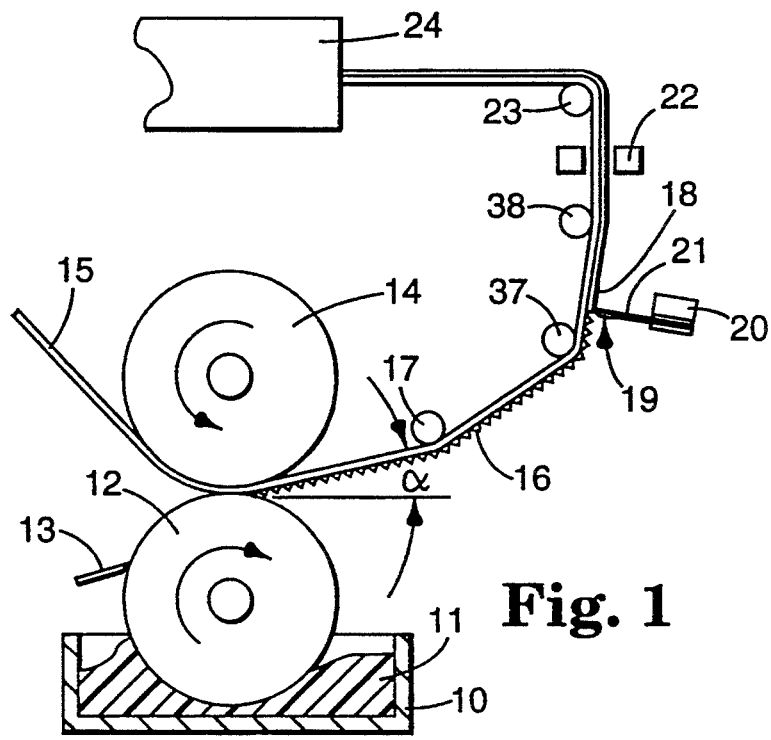
FIG. 1 is an elevation of direct gravure apparatus for continuously applying a coating of a fluid dispersion of magnetizable particles and binder to a flexible backing web and smoothing the wet coating in accordance with the invention.

Referring to FIG. 1, a pan 10 of a direct gravure coater is continuously supplied with a fluid dispersion 11 of magnetizable particles and binder. The dispersion is picked up in the fine grooves of a gravure roll 12 which is scraped by a doctor blade 13 so that substantially the only material left is that contained in the grooves. A resilient roll 14 presses a flexible backing web 15 against the gravure roll 12 which thus drives the resilient roll and backing web in the same speed and in the same direction as the gravure roll. Consequently, a wet coating 16 (the pickout) is deposited onto the backing web in substantially a mirror pattern of the gravure grooves.

The backing web 15 moves substantially horizontally as it emerges from the nip between the gravure roll 12 and the resilient roll 14. Next, its uncoated face contacts a take-off idler roll 17, the position of which is vertically adjustable to provide a take-off angle $\alpha$ of from $-20°$ to $45°$ degrees to a line perpendicular to a line connecting the centers of the gravure roll and resilient roll. Minor defects in pickout can sometimes be eliminated by small adjustments in the take-off angle $\alpha$. Before significant evaporation of volatile vehicle, the wet coating pattern is smoothed out by the free end 18 of a rectangular piece of flexible film 19 that extends across the full width of the coating. The other end of the piece of flexible film is secured by a mount 20 (see FIGS. 2 and 3), allowing the free end 18 to drag against the coating, thus causing the flexible film to form an arc between its secured end and the convergence of the flexible film with the wet coating. The coated backing web passes between a pair of bar magnets 22 to physically align the magnetizable particles and is overdriven by a pull roll 23, thus creating a back tension in the backing web. The backing web then passes through a heated oven 24 to dry the coating.

The mount also holds a backup bar that is a flat, rigid, rectangular plate 21, the outer edge 21a of which is straight and contacts the flexible film orthogonally across its full width, thus reducing the radius of curvature of the arc of the flexible film 19 where it is contacted by the straight edge. The straight edge 21a of the flat plate 21 can be somewhat rounded in the direction that the backing web travels, but its roundness should have substantially no effect upon the radius of curvature to which the straight edge 21a deflects the flexible film.

Figure 2:
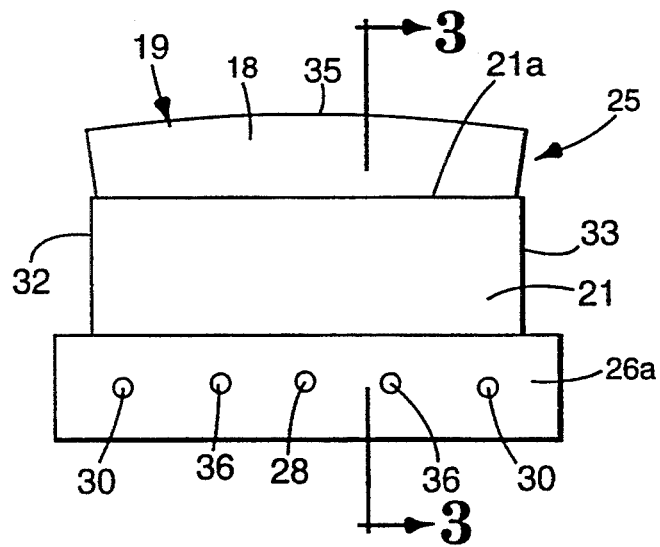
FIG. 2 is a plan view of a sub-assembly of the apparatus of FIG. 1, greatly enlarged, showing the pretensioning of the trailing edge of the flexible film that smooths the wet coating.
Figure 3:
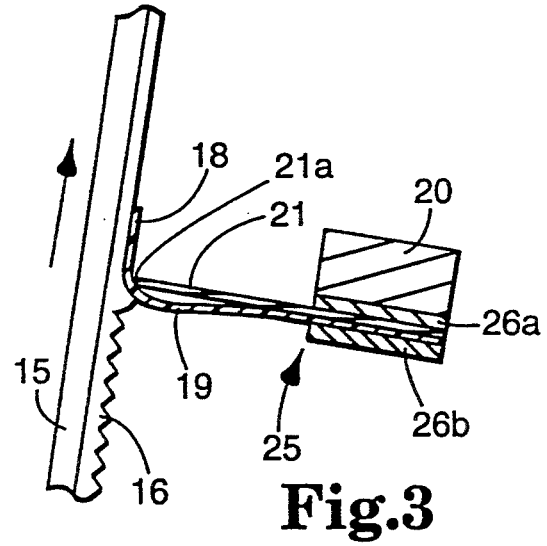
FIG. 3 is a section along line 3—3 of FIG. 2 while the sub-assembly being used to smooth a wet coating.

As can be seen in FIGS. 2 and 3, secured to the mount 20 is a sub-assembly 25 which has a clamp including a pair of flat jaws 26a and 26b. Both the flexible film 19 and flat plate 21 have been positioned between the jaws and moved into contact with a central screw 28 which is then tightened. Two lateral screws 30 are set back so that when the center of the flexible film is stopped by the central screw 28, each of its projecting edges 32 and 33 can be pulled back a distance as great as 0.5% of the width of the flexible film 19. The lateral screws 30 are tightened while each of the projecting edges 32 and 33 is being pulled by one's fingertips, thus putting the free end 18 of the flexible film under tension so that its originally straight trailing edge 35 becomes slightly bowed (exaggerated in FIG. 2), after which intermediate screws 36 are tightened. The tension that bows the trailing edge 35 acts as means for holding the free end of the flexible film 19 in contact with the wet coating 16 across its full width, thus helping to keep the backing web 15 flat. Doing so is especially important when the coating is wide or when the backing web is advancing at a high speed.

As shown in FIG. 1, the take-off idler roll 17 redirects the backing web across the span between an upstream idler roll 37 and an downstream idler roll 38. Preferably, the backing web travels a distance of from 0.25 to 6 inches (0.6 to 15 cm) between the upstream idler and the line along which the flexible film 19 first contacts the wet coating. If that distance were substantially less than 0.25 inch (0.6 cm), imperfections of the upstream idler might introduce imperfections into the wet coating 16. On the other hand, if that distance were substantially greater than 6 inches (15 cm), the backing web might not be adequately supported where it is contacted by the free end 18 of the flexible film, in which event the smoothed coating 16 might be of nonuniform thickness laterally. For the same reason, the span between the upstream and downstream idlers should not exceed 50 inches (125 cm), but that span should be at least 3 inches (7.5 cm).

The mount 20 is adjustable during smoothing to be movable with micrometer precision horizontally, vertically, and pivotably while keeping the mouth of the flat jaws 26a and 26b substantially parallel to and extending crosswise to the wet coating 16. This permits an experienced operator to adjust the radius of curvature of the of the arcuate portion of the flexible film 19 where it is contacted by the straight edge 21a of the flat plate 21. Such an adjustment can prevent the recurrence of defects that may appear in the smoothed coating. Preferably, the operator can adjust the position of the straight edge to change the radius of curvature to be from 0.03 to 0.5 inch (0.075 to 1.25 cm). If the radius of curvature were substantially less than 0.03 inch (0.075 cm), the flexible film might skive off part of the coating 16. On the other hand, if the radius of curvature were substantially greater than 0.5 inch (1.25 cm), the wet coating might not be smoothed to be substantially free from imperfections.

The free end be of the flexible film should drag against the wet coating over a length of from 0.25 to 30 inches (0.6 to 75 cm). Preferably, the drag length is from 0.5 to 20 inches (2 to 50 cm). Below that range, there is a danger that the film might not smooth the coating to have uniform thickness and to be substantially free from imperfections. Above that range, the drag might be so great as to produce an undesirably large drop in tension in the backing web 15 upstream of the straight edge 21a.

Figure 4:
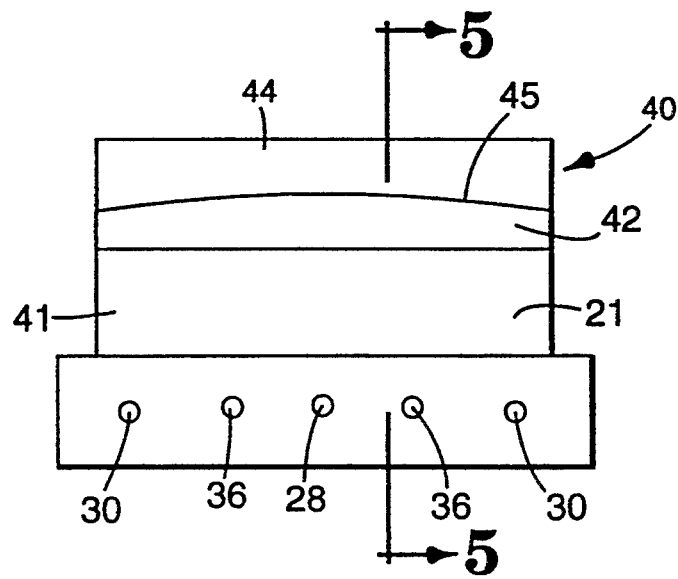
FIG. 4 is a plan view of a second sub-assembly of the invention that can be substituted for the sub-assembly of FIGS. 1-3.
Figure 5:
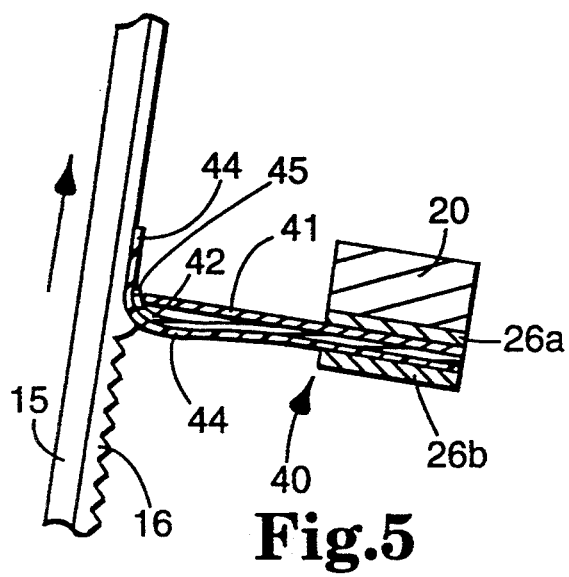
FIG. 5 is a section along line 5—5 of FIG. 4 while the sub-assembly is being used to smooth a wet coating.

In the sub-assembly 40 of FIGS. 4 and 5, elements that are common to FIGS. 1–3 have the same reference characters. The backup bar consists of a flat, rigid, rectangular plate 41 plus a flexible sheet 42, both of which are held by the jaws 26a and 26b along with a rectangular piece of flexible film 44 that can be identical to the flexible film 19 of FIGS. 1–3, but its edges are not pulled back toward the lateral screws 30. The outer edge 45 of the flexible sheet 42 presses against substantially the full width of the flexible film 44. Because the outer edge 45 is convex, it acts as a means for holding the free end of the flexible film 44 in contact with the wet coating 16, thus helping to keep the backing web 15 flat. To be effective for this purpose, the radius of curvature of the convex edge 45 should be no greater than 60 inches (150 cm), and it preferably is at least 20 inches (50 cm).

The stiffness of the flexible sheet 42 should be at least as great as that of a biaxially oriented poly(ethyleneterephthalate) film that is 4 mils (100 μm) thick and should be at least as great as that of the flexible film 44. Because the flexible sheet 42 is relatively stiff and projects only a short distance beyond the flat plate 41, it is bent very little by the dragging force, thus enabling the convex edge 45 to be positioned with reasonable precision.

When the free edge of the flat, rigid plate 41 of the sub-assembly 40 is convex, the flexible sheet 42 can be eliminated, because the convex edge of a rigid plate can act as a means for holding the free end of the flexible film 19 in contact with the wet coating 16 over its full width. When the rigid plate 41 has a convex edge, its radius of curvature preferably is from 20 to 60 inches (50 to 150 cm).

Figure 6:
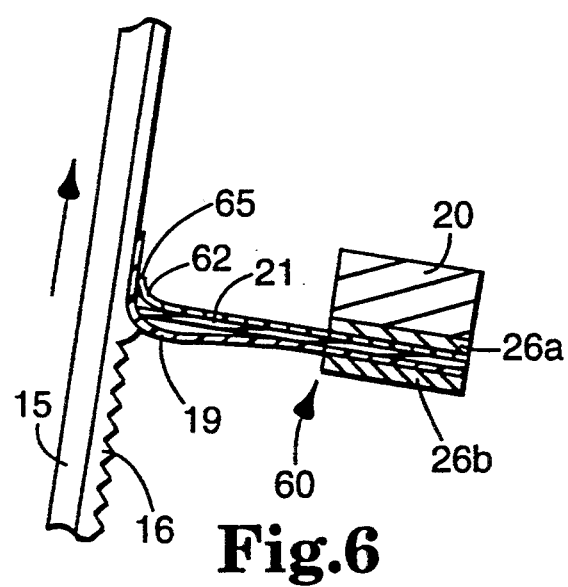
FIG. 6 is a central section through a third sub-assembly of the invention, that can be substituted for the sub-assembly of FIGS. 1-3 and is shown being used to smooth a wet coating.

In the sub-assembly 60 of FIG. 6, elements common to FIGS. 1–3 have the same reference characters. The sub-assembly 60 differs from the sub-assembly 25 of FIGS. 1–3 by having, secured between the jaws 26a and 26b (in addition to the rectangular piece of flexible film 19 and the flat, rectangular plate 21), a rectangular flexible sheet 62. Like the flexible sheet 42, the rectangular flexible sheet 62 should be at least as stiff as a biaxially oriented poly(ethyleneterephthalate) film that is 4 mils (100 μm) thick and should be at least as stiff as the flexible film 64. The free end of the flexible sheet 62 rests against the free end 18 of the flexible film 19 across substantially its full width and has a convex edge 65 like the convex edge 45 of the flexible sheet 42 of FIG. 4. The convex edge 65 acts as means for holding the free end of the flexible film 64 in contact with the wet coating 16 across its full width.

Preferably, each of the flexible film 19 of FIGS. 1–3, the flexible film 44 of FIGS. 4–5, and the flexible film 64 of FIG. 6 is a biaxially oriented polymeric film of from 1 to 5 mils (25 to 125 μm) in thickness; and each of the flexible sheet 42 of FIGS. 4–5 and the flexible sheet 62 of FIG. 6 is a biaxially oriented polymeric film of from 4 to 16 mils (100 to 400 μm) in thickness.

Figure 7:
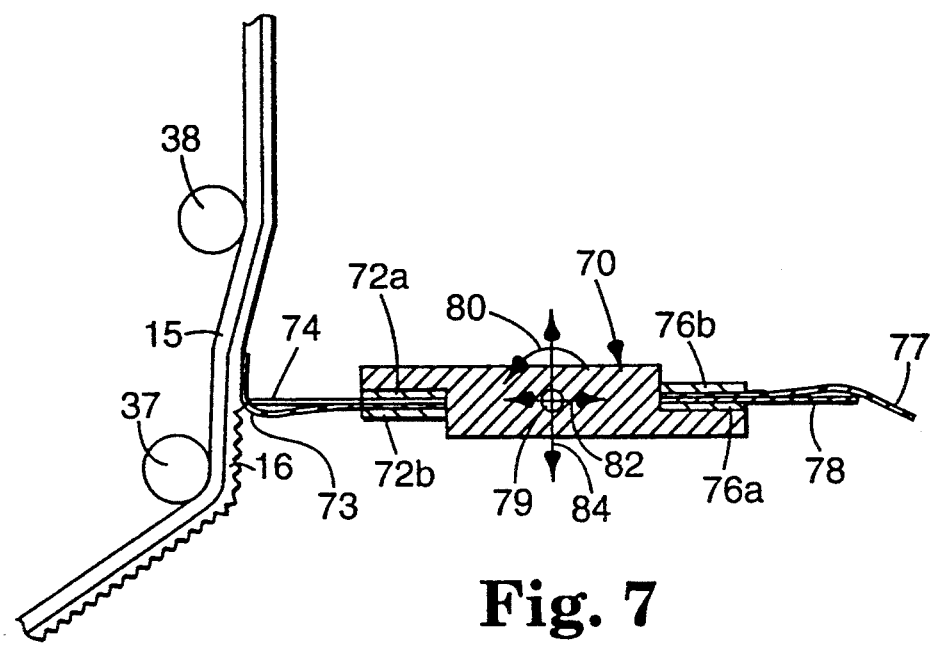
FIG. 7 is a central section through a mount enabling a worn piece of flexible film to be replaced without interrupting the manufacturing process.

In FIG. 7, at each end of a mount 70 is pair of flat jaws that are identical to the jaws 26a and 26b of FIG. 3 and can put the free end of a flexible film under tension as described above in connection with FIG. 2. At one end of the mount, a pair of jaws 72a and 72b clamp ends of a first piece of flexible film 73 and a flat, rigid, rectangular plate 74. At the other end of the mount, a pair of jaws 76a and 76b clamp ends of a second piece of flexible film 77 and a flat, rigid, rectangular plate 78. At the center of the mount is a shaft 79 which can be rotated 360° in increments of 180° (counterclockwise as indicated by an arrow 80 in FIG. 7) to allow the worn piece of flexible film to be changed. During each 180° rotation, the mount 70 should be stepped back and forward (arrow 82) to move the fresh piece of flexible film into precisely the same position as the worn piece of film had occupied. After each rotation, the remote pair of jaws can be easily opened by the operator to replace the worn piece.

Rotation of the mount 70 can be controlled by a first of three stepper motors (not shown), and its back-and-forward movement can be controlled by a second of the stepper motors. The third stepper motor permits an operator to adjust the spacing (arrow between the upstream idler roll 37 and the piece of flexible film 73.

Preferably, the novel smoothing apparatus includes means for automatically rotating the mount during the passage of a splice, which means can adjustable to effect the rotation at every splice or after the passage of n splices, where n is a whole number. The mount-rotating means can include:

(1) means for measuring the distance traveled by the coated backing web from the splice-forming device to the smoothing apparatus,
(2) means for calculating the time t required for the splice to travel that distance, and
(3) means opening the stack a moment before time t.

The rotation and re-engagement should be fast so that only a small length of the wet coating passes without being smoothed.

EXAMPLE 1

Apparatus as shown in FIGS. 1–3 has been used to make magnetic recording media except replacing the subassembly 25 with the subassembly 40 of FIGS. 4–5. The flexible film 44 was biaxially oriented poly(ethyleneterephthalate) film having a thickness of 5 mils (125 $\mu$m) and a width of 12.5 inches (30 cm). It projected 2.5 inches (6.35 cm) from the jaws. The plate 41 was brass having a thickness of 0.05 inch (0.13 cm), and it projected 1.5 inches (3.8 cm) from the jaws of the clamp. The flexible sheet 42 was biaxially oriented poly(ethyleneterephthalate) film having a thickness of 5 mils (1.27 $\mu$m) and the same width as the flexible film 44. The radius of curvature of its convex edge 45 was 37.5 inches (95 cm). The convex edge projected 1.9 inches (4.8 cm) from the jaws of the clamp. The span across upstream and downstream idler rolls 37 and 38 was 6.25 inches (16 cm), and the spacing from the upstream idler roll 37 to the initial contact between the flexible film 44 and the coating was 3.5 inches (8.9 cm).

The apparatus was employed to apply a magnetizable coating onto a flexible backing web consisting of biaxially oriented poly(ethyleneterephthalate) film having a thickness of 0.26 mil (6.6 $\mu$m) and a width of 12.5 inches (31.8 cm). Continuously supplied to the gravure roll was a dispersion of acicular $Fe_2O_3$ particles in a solution of polyurethane binder in methylethylketone while the backing web was advanced at a speed of 300 ft/min (91.5 m/min). The dispersion had a solids content of 36% and a viscosity of 28 cps at 10000 $sec^{-1}$ shear rate. The coating apparatus included a steel blade for scraping dispersion from the lands. The take-off idler roll was adjusted to provide a take-off angle $\alpha$ of 2°. The patterned coating had merged pickout (i.e., adjacent ridges of the coating were interconnected by the applied dispersion). After being smoothed by the above-described smoothing equipment, magnetically oriented, and dried, the resulting magnetizable layer had a uniform dry thickness of 0.065 mil (1.65 $\mu$m) and was virtually free from defects, both when examined under a microscope and when used to record and play back information.

EXAMPLE 2

A magnetic recording medium has been made in the same manner as in Example 1 except (1) replacing the subassembly 40 with the subassembly 60 of FIG. 6, (2) employing a flexible backing web having a thickness of 0.18 mil (4.5 $\mu$m), and (3) advancing the backing web at a speed of 250 ft/min (76 m/min). Its flexible film 19 and rectangular plate 21 were identical to the flexible film 44 and the plate 41, respectively, of Example 1. Its flexible sheet 62 was biaxially oriented poly(ethyleneterephthalate) film having a thickness of 7 mils (18 $\mu$m) and a width of 12.5 inches (31.8 cm). The radius of curvature of its convex edge 65 was 37.5 inches (95 cm). The convex edge projected 1.75 inches (4.45 cm) from the jaws of the clamp.

After being smoothed by the above-described smoothing equipment, magnetically oriented, and dried, the resulting magnetizable layer had a uniform dry thickness of 0.062 mil (1.57 $\mu$m) and was virtually free from defects, both when examined under a microscope and when used to record and play back information.

What is claimed is:

1. Apparatus for continuously smoothing a wet coating of magnetizable particles and binder on a flexible elongated backing member that is being advanced longitudinally, which apparatus comprises:
   (a) mounting means,
   (b) a flexible film secured at one end by the mounting means, leaving its opposite end free to drag against the wet coating, thus causing the flexible film to form an arc between its secured end and the convergence of the flexible film with the coating,
   (c) means for deflecting the arcuate portion of the flexible film toward the coating along a line extending tranversely across the full width of the flexible film,
   (d) means for moving the deflecting means to change the position of said transverse line to adjust the radius of curvature of the arc at said line, and
   (e) a flexible sheet secured at one end to the mounting means and formed with a convex edge which presses against substantially the full width of the free end of the flexible film to hold the flexible film in contact with the wet coating, which flexible sheet has a stiffness at least as great as that of the flexible film.

2. Apparatus as defined in claim 1 wherein said convex edge has a radius of curvature of from 20 to 60 inches.

3. Apparatus as defined in claim 1 wherein:
   (1) the mounting means comprises a clamp;
   (2) the deflecting means comprises a rigid plate which is formed with a straight edge that extends transversely across the full width of the flexible film; and
   (3) the rigid plate, flexible film, and flexible sheet are secured by the clamp so that the convex edge of the flexible sheet presses against the flexible film.

4. Apparatus as defined in claim 3 wherein the flexible sheet is positioned between the rigid plate and the flexible film.

5. Apparatus as defined in claim 3 wherein the rigid plate is positioned between the flexible sheet and the flexible film.

6. Apparatus as defined in claim 1 wherein the stiffness of the flexible sheet is at least as great as that of biaxially oriented poly(ethyleneterephthalate) film which is 100 μm thick.

7. Apparatus as defined in claim 1 wherein the flexible sheet is a biaxially oriented polymeric film of from 4 to 16 mils in thickness and the flexible film is a biaxially oriented polymeric film of from 1 to 5 mils in thickness.

8. Apparatus as defined in claim 7 wherein each of the flexible film and flexible sheet comprises biaxially oriented poly(ethyleneterephthalate) film.

9. Apparatus as defined in claim 1 and further comprising a pair of idler rolls for supporting the uncoated face of the backing member across a span, and the mounting means is so positioned that free end of the flexible film drags against the wet coating at that span.

10. Apparatus as defined in claim 9 wherein the mounting means is so postioned that there is a distance of 0.25 to 6 inches between the the upstream idler roll and a line along which the flexible film first contacts the wet coating.

11. Apparatus as defined in claim 1 wherein the length of the flexible film is such that the film drags against the wet coating over a length of from 2 to 20 inches.

12. Apparatus for continuously smoothing a wet coating of magnetizable particles and binder on a flexible elongated backing member that is being advanced longitudinally, which apparatus comprises:
  (a) mounting means,
  (b) a flexible film secured at one end by the mounting means, leaving its opposite end free to drag against the wet coating, thus causing the flexible film to form an arc between its secured end and the convergence of the flexible film with the coating,
  (c) a rigid plate secured by the mounting means and formed with a convex edge that extends transversely across substantially the full width of the flexible film to hold the flexible film in contact with the wet coating, and
  (d) means for moving the mounting means to change the position of said convex edge to adjust the radius of curvature of the arc.

13. Apparatus as defined in claim 12 wherein said convex edge has a radius of curvature of from 20 to 60 inches.

14. Apparatus for continuously smoothing a wet coating of magnetizable particles and binder on an elongated backing member that is being advanced longitudinally, which apparatus comprises:
  (a) a clamp having a pair of flat jaws,
  (b) a flexible film which is secured at one end between the jaws, leaving its opposite end free to drag against the wet coating, thus causing the flexible film to form an arc between its secured end and the convergence of the flexible film with the coating,
  (c) a flat plate which is secured between the jaws and is formed with a straight edge that extends orthogonally to the direction in which the backing member travels and across substantially the full width of the flexible film,
  (d) means for moving the clamp to change the position of the straight edge to adjust the radius of curvature of the arc of the flexible film, and
  (e) a flexible sheet which is secured at one end by the clamp, leaving its opposite edge, which is convex, to press against and hold the free end of the flexible film in contact with the wet coating across the full width of the coating.

15. Method of continuously smoothing a wet patterned coating of magnetizable particles on an elongated backing member that is being advanced longitudinally, which method comprises:
  (a) securing a flexible film at one one end, leaving its opposite end free to drag against the full width of the wet coating, thus causing the flexible film to form an arc between its secured end and the convergence of the flexible film with the wet coating,
  (b) deflecting the arcuate portion of the flexible film toward the coating along a line extending transversely across the full width of the flexible film, thus reducing the radius of curvature of the arc, and
  (c) pressing an edge of a flexible sheet against substantially the full width of the free end of the flexible film, which flexible sheet has a stiffness at least as great as that of the flexible film.

* * * * *